(12) United States Patent
Valkó

(10) Patent No.: US 6,519,248 B1
(45) Date of Patent: Feb. 11, 2003

(54) PACKET DATA NETWORK HAVING DISTRIBUTED DATABASE

(75) Inventor: András Valkó, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/121,993

(22) Filed: Jul. 24, 1998

(51) Int. Cl.[7] ............................................... H04L 12/66

(52) U.S. Cl. .................. 370/352; 370/395.31; 370/401; 455/433

(58) Field of Search ................................ 370/328, 329, 370/336, 338, 345, 349, 352, 353, 354, 355, 356, 401, 402, 403, 404, 405, 395.3, 395.31; 455/422, 432, 433, 435, 445, 456, 457

(56) References Cited

U.S. PATENT DOCUMENTS

| | | | |
|---|---|---|---|
| 5,088,108 A | | 2/1992 | Udenfeldt et al. |
| 5,109,528 A | | 4/1992 | Uddenfeldt |
| 5,327,577 A | | 7/1994 | Uddenfeldt |
| 5,333,189 A | | 7/1994 | Clary et al. |
| 5,412,654 A | | 5/1995 | Perkins |
| 5,533,026 A | * | 7/1996 | Ahmadi et al. ............. 370/349 |
| 5,652,465 A | | 7/1997 | Hosoda et al. |
| 5,729,531 A | | 3/1998 | Raith et al. |
| 5,751,731 A | | 5/1998 | Raith |
| 5,757,813 A | | 5/1998 | Raith |
| 5,768,267 A | | 6/1998 | Raith et al. |
| 5,845,215 A | | 12/1998 | Henry et al. |
| 6,075,776 A | * | 6/2000 | Tanimoto et al. ........... 370/254 |
| 6,084,892 A | * | 7/2000 | Benash et al. ............. 370/701 |
| 6,181,935 B1 | * | 1/2001 | Gossman et al. ........... 455/433 |

FOREIGN PATENT DOCUMENTS

| | | |
|---|---|---|
| JP | 6-188780 | 7/1994 |
| WO | 95/16330 | 6/1995 |
| WO | 95/28063 | 10/1995 |
| WO | 97/29606 | 8/1997 |
| WO | 97/39413 | 10/1997 |
| WO | 97/47120 | 12/1997 |
| WO | 98/32294 | 7/1998 |
| WO | 99/31917 | 6/1999 |

OTHER PUBLICATIONS

Sharman, "Connection of Mobile Devices to Heterogenous Networks", Apr. 1, 1997, United States Statutory Invention Registration No. H1641.*

Bjornland, D.F. et al., "UMTS—The Universal Mobile Telecommunications System" Telktronikk, pp. 127–132, (Aug. 1996).

Callendar, Michael H., "International Mobile Telecommunications—2000 Standard Efforts of the ITU", IEEE Personal Communications vol. 4, No. 4, pp. 6–7, (Aug. 1997).

Buchanan, Ken et al., "IMT–2000: Service Provider's Perspective", IEEE Personal Communication vol. 4, No. 4, pp. 8–13, (Aug. 1997).

Leite, Fabio et al., "Regulatory Considerations Relating to IMT–2000", IEEE Personal Communications vol. 4, No. 4, pp. 14–19, (Aug. 1997).

(List continued on next page.)

*Primary Examiner*—Kwang Bin Yao

(57) ABSTRACT

Communication networks and network nodes for carrying packet data traffic have architectures that give large freedom in network topology and simplify network extensions, accompanied by a lightweight but robust protocol. A network may be a cellular network that handles packet data traffic and voice traffic. Location information relating to terminals in a network may be determined through terminal-originated packets or control messaging. Stored location information may be cleared by elapse of time or specific messaging. Location information for different kinds of terminals may be stored in a centralized or distributed database.

37 Claims, 5 Drawing Sheets

OTHER PUBLICATIONS

Randya, Raj et al., "IMT–2000 Standards: Network Aspects", *IEEE Personal Communications* vol. 4, No. 4, pp. 20–29, (Aug. 1997).

Carsello, Richard et al., "IMT–2000 Standards: Radio Aspects", *IEEE Personal Communication* vol. 4, No. 4, pp. 30–40, (Aug. 1997).

Nikula, E. et al., "FRAMES Multiple Access for UMTS and IMT–2000", *IEEE Personal Communications* vol. 5, No. 2, pp. 16–24, (Apr. 1998).

Perkins, C., "IP Mobility Support", http://www.ietf.org/internet–drafts/draft–ietf–mobile–protocol–15.txt.(Feb. 1996).

Huitema, C., Routing in the Internet, Prentice Hall, pp. v–vii, 65–70, 72–78, 99, (1995).

Clark, D. et al., "An Approach to Service Allocation in the Internet", *http://ietf.org/internet–drafts/draft–clark–diff–svc–alloc–00.txt, Internet Engineering Task Force* (Jul. 1997).

Nichols, et al., "A Two–bit differentiated Services Architecture for the Internet", *http://iet.f.org/internet–drafts/draft–nichols–diff–svc–arch–00.txt, Internet Engineering Task Force* (Nov. 1997).

Clark, D. et al., "Explicit Allocation of Best Effort Packet Delivery Service", *http://diffserv.lcs.mit.edu/Papers/exp–alloc–ddc–wf.pdf*, (Nov. 1997).

Perkins, C., "IP Mobility Support version 2", *http://ietf.org/internet–drafts/draft–ietf–mobileip–v2–00.txt*, (Nov. 12, 1997).

Veeraraghavan, M. et al, "Mobile Location Management in ATM Networks", *IEEE Communications*, vol. 15, No. 8, Oct. 1997, pp 1447–1454.

Krause, Reinhardt, "Ericsson Wants to Take Internet Throught the Air", *Investors Business Daily*.

Valkó, András G., "Wireless Access Networks: A Novel Approach to Internet Host Mobility".

\* cited by examiner

R: ROOT PORT
L: LEAF PORT

| O&M PACKET TYPE | INFORMATION ELEMENT | COMMENT |
|---|---|---|
| KEEP-ALIVE PACKET | MOBILE TERMINAL IDENTIFIER | SENT BY THE MOBILE TERMINAL TOWARDS THE G/W NODE |
| PAGING PACKET | MOBILE TERMINAL IDENTIFIER | SENT BY ANY NODE TO ITS LEAF PORTS, REPEATED BY OTHER NODES TO LEAF PORTS |
| SHOW-UP PACKET | MOBILE TERMINAL IDENTIFIER | SENT BY THE MOBILE TERMINAL TOWARDS THE G/W NODE |

FIG. 4

| ENTRY NO. | MOBILE TERMINAL IDENTIFIER | PORT-LIST |
|---|---|---|
| 1 | TERMINAL X | PORT1, PORT2, PORT4 |
| 2 | TERMINAL Y | PORT4 |
| 3 | TERMINAL Z | PORT1, PORT3 |

FIG. 6 mobile-id <- identifier of sending mobile terminal port-id <- identifier of the leaf-port the packet came through packet-type <- data/keep-alive/show-up IF (node is LMP AND mobile-id has LMP entry AND port-id is on its port-list) THEN reset timer of this port to LMP-timeout END IF IF (node is LMP AND mobile-id has LMP entry AND port-id is not on its port-list) THEN add port-id to the port-list and set its timer to LMP-timeout END IF IF (node is LMP AND mobile-id has no LMP entry) THEN create LMP entry for mobile-id, add port-id to its port-list, set its timer to LMP-timeout END IF IF (packet-type is data or show-up) THEN IF (node is CMP AND mobile-id has CMP entry AND port-id is on its port-list) THEN reset timer of this port to CMP-timeout END IF IF (node is CMP AND mobile-id has CMP entry AND port-id is not on its port-list) THEN add port to the port-list and set its timer to CMP-timeout END IF IF (node is CMP AND mobile-id has no CMP entry) THEN create CMP entry for mobile-id, add port-id to its port-list, set timer to CMP-timeout, IF (there are data packets queued with destination=mobile-id) THEN dequeue these packets, forward them to port-id END IF END IF (node is CMP)

END IF (packet-type is data or show-up)

IF (node is not G/W node OR packet-type is data) THEN forward packet to root-port END IF

STOP

FIG. 7 mobile-id <- identifier of destination mobile terminal packet-type <- data/paging IF (packet-type is data AND node is CMP AND mobile-id has CMP entry) THEN forward packet to ports listed in mobile-id's CMP port-list  END IF IF (packet-type is data AND node is CMP AND mobile-id has no CMP entry) THEN queue packet, create paging packet for mobile-id and route it as if arrived from root-port  END IF IF (packet-type is data AND node is not CMP) THEN forward packet to all leaf-ports  END IF IF (packet-type is paging AND node is LMP) THEN IF (mobile-id has LMP entry) THEN forward packet to ports listed in mobile-id's LMP port-list  ELSE forward packet to all leaf-ports  END IF

END IF

STOP

FIG. 8

PACKET DATA NETWORK HAVING DISTRIBUTED DATABASE

BACKGROUND

This invention relates to construction and control of communication networks that carry packetized data, e.g., Internet-protocol-based (IP-based) traffic, and in particular to network architectures that have large freedom in network topology and simplified network extensions with a lightweight but robust protocol. Applicant's invention is applicable to wired and wireless networks handling packet data traffic, including cellular radio networks handling voice traffic.

It is generally expected that the importance of packet data networks, and in particular IP-based networks, will continue growing. Although a large proportion of current IP-based traffic is "best effort", in the sense that the network does not guarantee any minimum level of bandwidth or quality of service to a user, the proportion requiring some guaranteed level of quality will only increase in the future. Such guarantees may eventually be provided by the currently evolving differentiated services concept, which is described in D. Clark and J. Wroclawski, "An Approach to Service Allocation in the Internet", http://ietf.org/internet-drafts/draft-clark-diff-svc-alloc-00.txt, Internet Engineering Task Force (July 1997); K. Nichols, V. Jacobson, and L. Zhang, "A Two-Bit Differentiated Services Architecture for the Internet", http://ietf.org/internet-drafts/draft-nichols-diff-svc-arch-00.txt, Internet Engineering Task Force (November 1997); and D. Clark and W. Fang, "Explicit Allocation of Best Effort Packet Delivery Service", http://diffserv.lcs.mit.edu/Papers/exp-alloc-ddc-wf.pdf (November 1997). The demand to access IP-based and other packet data networks from wireless terminals such as those operating in current cellular radio telephone networks will also increase.

Packet data networks are designed and based on industry-wide data standards such as the open system interface (OSI) model or the transmission control protocol/Internet protocol (TCP/IP) stack. In the communications industry, Layer 1 may be called the physical layer, and the Layer 1 protocol defines the parameters of the physical communications channel, e.g., frequency spacing of a radio carrier, modulation characteristics, etc. Layer 2 is called the data link, or hardware interface, layer, and the Layer 2 protocol defines the techniques necessary for the accurate transmission of information within the constraints of the physical channel, e.g., error correction and detection, etc. Layer 3 may be called the network, or resource control, layer, and the Layer 3 protocol defines the procedures for reception and processing of information transmitted over the physical channel. The functionality of a Layer 2 protocol includes the delimiting, or framing, of Layer 3 messages sent between communicating Layer 3 peer entities. In cellular radio telephone systems, an air interface protocol, such as TIA/EIA/IS-136 and TIA/EIA/IS-95 published by the Telecommunications Industry Association and Electronic Industries Association, is a combined Layer 1, 2, and 3 protocol that specifies how remote stations like cellular telephones communicate with base stations and a mobile services switching center (MSC).

These standards have been developed, whether formally or de facto, for many years, and the applications that use these protocols are readily available. The main objective of standards-based networks is to achieve interconnectivity with other networks. The Internet is today's most obvious example of such a standards-based network in pursuit of this goal. One approach to packet-based wireless communication is cellular digital packet data (CDPD), aspects of which are described in U.S. Pat. No. 5,729,531 and U.S. Pat. No. 5,768,267, both to Raith et al., and U.S. Pat. No. 5,751,731 and U.S. Pat. No. 5,757,813, both to Raith; in allowed U.S. patent applications Ser. Nos. 08/544,492 and 08/544,589, both by Raith et al., and Ser. Nos. 08/544,837 through Ser. No. 08/544,839; and in U.S. patent applications Ser. Nos. 08/544,493 and Ser. No. 08/544,835, both by Raith, Ser. No. 08/544,836 by Bilsstrom et al., and Ser. Nos. 08/544,841 and Ser. No. 544,843, both by Raith et al. These patents, allowed applications, and applications are expressly incorporated here by reference.

The bottleneck of IP-based communication with a wireless terminal is the air interface, which may be shared among wireless terminals by using a random access protocol, possibly with some soft-state-based priority for continuous transmissions, or by using a protocol as in conventional cellular radiotelephony that allocates a wireless channel to a terminal on a first-come-first-served basis. For packet data traffic like IP-based traffic, a random access (connectionless) protocol may be more appropriate than a channel allocation (connection-oriented) protocol. Such IP-based information flows originated or terminated by a wireless terminal typically have lower bit rates than the average wired IP flow. This limitation is especially felt when a base station's service area is large because the air interface capacity decreases with increasing cell size, as described in D. F. Bjornland et al., "UMTS—The Universal Mobile Telecommunications System", *Telektronikk* (August 1996); *IEEE Personal Communication* vol. 4, no. 4 (August 1997); and E. Nikula et al., "FRAMES Multiple Access for UMTS and IMT-2000", *IEEE Personal Communications* vol. 5, no. 2 (April 1998).

Wireless users may be willing to accept lower bit rates than wired users due to the air interface bottleneck, but wireless users will expect to use the same hardware and software as wired users. Thus, the wired part of the network should be unaware of the mobility of the users, except possibly for minor modifications. Although these features are not strict requirements, a communication system having these features can be expected to be more widely and easily accepted.

Although it is important, air interface bandwidth efficiency may not be the primary requirement for a cellular access network serving IP-based communication. Applicant believes that low equipment cost, robustness, scalability, low maintenance, and easy system establishment and expansion (growth), which are features typical of IP-based networks, will be more important to cellular network operators. Scalability is a feature that makes an architecture or technique applicable to large and small networks; expansion or extension are the actions necessary for making a network larger (e.g., plug in new nodes, etc.). These features are distinct, and both are desirable.

Another problem with cellular systems is that they must keep track of the movements of the served mobile users so that the users can be found when they have incoming calls/data. Usually the system is divided into a large number of cells, making it inefficient to maintain a central database that knows the exact location of each user's terminal because frequent movements generate a large load of movement-indications sent to this central database. On the other hand, such exact location information is desirable because the more precise the location information is, the faster and less wastefully a remote terminal can be found for an incoming call. Network actions taken when a mobile station has an incoming call and has to be searched for (because its exact location is unknown) is usually called paging. The more exact the location information is, the fewer the cells that must be paged for the mobile, which means less load.

In most cellular systems (e.g., systems operating according the GSM standard), an intermediate solution is used. A central database has some information on the location of each remote terminal, but this information is not exact. The service area of the system is divided into location areas, each of which contains a number of cells. The central location database knows in which location area each remote terminal is, but not in which of the location area's cells it is. When a remote terminal has an incoming call, the terminal is paged in all the cells of the known location area. The optimal point in the trade-off is achieved by selecting the proper size of the location areas.

This solution largely relies on a central database that may be duplicated for reliability but is still a point of failure. Due to the centralized approach, this solution also has scalability problems since location update messages sent to the central database impose a load on the network that gets more and more significant as the network gets larger. Also, this approach requires that the network topology rarely or never changes during operation and that this topology is known to the database and to most other network elements.

These limitations become a lot more annoying when a network is used for IP data traffic for several reasons. The number of IP users per unit area is usually larger than the number of voice users per unit area. Due to the larger bit rates for IP communication, the cell sizes have to be decreased (becoming microcells and picocells), and thus location changes become much more frequent. Traffic often consists of short bursts instead of long continuous transmissions, and thus the amount of paging relative to the amount of traffic increases. As do operators of data networks in general, operators of cellular networks carrying packet data will likely require their cellular system to be easy to install and to extend, to be failure-proof, robust, and simple.

Another problem area in cellular access networks is that traffic destined for a mobile user must be sent to the user's current location, which can change even while the user is engaged in a conversation. It is important to minimize the probability and duration of periods when data cannot reach the mobile because its location has become "unknown", but at the same time it is important to avoid sending data to too many locations for safety since that results in a waste of resources.

Most existing cellular systems are connection-oriented, meaning that when data is sent to a remote terminal, a logical channel is established from the point where data enters the cellular network to the base station that the remote terminal is in contact with. This logical channel is used until the mobile terminal leaves the coverage area of the base station (or the conversation is terminated), and the channel is then released. If the mobile terminal moves into the coverage area of another base station, a new logical channel is established, and traffic is switched from the old channel to the new one.

The connection-oriented handling of traffic requires that all the nodes involved in a data path be informed when the connection is established and when it is re-routed or released. For high rates of connection handoffs, this results in a large load of control messages in the network, especially for networks having decreased cell sizes due to increased data rates.

Furthermore, connection-oriented systems tend to have low resource efficiency if traffic is bursty, which is typical of IP traffic. Thus while today's cellular networks fit voice applications well, they are inefficient for data traffic.

Also, the connection-oriented approach is based on a "connection-establishment" phase, usually called call-setup, that precedes the transmission of actual voice traffic and that after the conversation there is a "connection-release" phase. This is generally not the case for IP traffic. The traditional cellular approach is therefore hardly usable for IP traffic because the network does not get an establishment message before user data is sent, so there is no time to set up a connection. Also, an IP network is not informed when a communication is over, and hence an established connection would remain open unless a special mechanism watched user data activity and cleared the connection after a long pause. This obviously results in further problems.

Another problem area of some conventional cellular systems, particularly systems using code division multiple access (CDMA), is that data sent from/to a remote terminal can be sent through multiple base stations, and these duplicates travel in the wired access network separately to/from a gateway to a larger network, such as the Internet. This redundancy (also called macrodiversity) is needed because the air interface may have a large bit error rate so the probability of data packets getting spoiled in the air interface is not negligible. Out of duplicates sent in a macrodiversity state, it is possible to select one that was not spoiled based on, for instance, an estimate of the air interface error rate sent together with each packet.

For a seamless handoff of a data stream or session from one base station or sector to another base station or sector, it is advantageous to establish the data path with the new base station before the one with the old base station is torn down. This form of "make-before-break" communication is sometimes called "soft" handoff, meaning that for a certain time two (or more) data streams are active in parallel. In order to prepare for eventual handoffs, it may be required to keep parallel paths active for a large proportion of operation time.

Unlike in today's cellular systems, in a cellular system based on IP technology, transmission of packets in the wired network may not be guaranteed. Packets may get lost due to congestion of the wired network or due to hardware failure, and hence in IP systems macrodiversity protects not only against errors in the air interface but also against loss in the wired network. It can be noted that it may be technically feasible to build an IP-based cellular network that guarantees packet transmission in the wired network, but making a cellular network "better" than the global Internet might be considered wasteful Macrodiversity requires that data paths be duplicated at some point and re-united at another point. The remote terminal can be responsible for duplicating paths in the uplink (remote-to-base) and re-uniting them in the downlink (base-to-remote). Duplicating in the downlink and re-uniting in the uplink must be performed by devices in the wired access network.

In existing and in most planned systems with macrodiversity, nodes at one level of the hierarchically built cellular network are equipped with macrodiversity combiner devices that combine duplicate information in the uplink and create duplicates in the downlink. These combiner devices are assigned to connections at connection establishment (call setup), and they serve a session until it is released. This solution has at least the following drawbacks.

A combiner device assigned to a path at call setup usually cannot be replaced by another combiner device during the call. Thus, even when a mobile terminal has moved far away from its original location, the two or more data paths have to go separately back to the macrodiversity combiner that was originally selected, increasing network load in vain.

Since a macrodiversity combiner is an expressive device, how many of such devices to place at a node is a serious dimensioning problem. In traditional approaches, the number of devices in a node must be sufficient for all connections that may ever go through the node because there are no devices at multiple network levels and no connection can operate without a macrodiversity combiner. Thus, combiner devices can be poorly utilized, wasting computing resources.

The location of macrodiversity combiners is a trade-off. From a dimensioning point of view, combiners should be placed high in the hierarchical access network so that they are as concentrated as possible because concentration always results in higher utilization when there are statistically shared resources. Moreover, the higher is the combination point of duplicate paths, the lesser is the cross-traffic that results from mobile terminals roaming far during active calls. On the other hand, placing combiners high in the hierarchical network makes the length of the duplicate paths long, wasting resources.

Perhaps most important is that the solution used today relies on the connection-oriented nature of cellular traffic. Macrodiversity combiners are assigned to a connection at call setup and are released at call teardown. They cannot be used in a network where the notion of "connections" does not exist, as is the case for IP traffic. Data sent by a user using IP is not preceded by a connection-establishment phase and is not followed by a connection-release phase, and it is therefore not possible to allocate macrodiversity devices to a data stream when it starts and release them when it ends.

Applicant's invention provides a way to build and control wireless networks that carry packet data traffic and a lightweight but robust protocol that enables communication of regular packets, e.g., IP-based packets, to/from a wireless user, such as a mobile terminal in a cellular radio network. The similarity of Applicant's communication protocol to the conventional Internet protocol permits re-use of IP routers in a cellular radio network, although such re-use is not required. The functionality needed in the nodes of a network in accordance with the invention includes just a subset of the functionality of IP routers, allowing Applicant's network to use simpler and cheaper devices. The simplicity of the nodes in Applicant's network is currently believed to be a significant advantage of Applicant's invention. After all, nodes that are IP routers are currently difficult to use in networks that have space or cost limitations, such as an indoor network having a base station in each room of a structure, since IP routers are complex and expensive.

Applicant's invention provides the further significant benefits of network scalability and fault tolerance that derive from the distributed nature of the invention. The absence of a central controller makes network installation and extension simple and fast.

One area in which Applicant's invention can be applied is wireless local area networks (LANs), even if the LAN users were distributed on several floors or in several buildings. Users of portable computers would be provided with a common environment while they move around in the entire office area.

Another important application is providing Internet access to users of cellular mobile telephones. Most existing cellular telephony networks are not optimal for carrying IP traffic, but their infrastructures can readily support a system implemented according to Applicant's invention. A cellular operator can then appear as an Internet Service Provider for its subscribers.

Although Applicant's invention may find its common applications in wireless systems, it is believed Applicant's invention is also applicable in wired environments. In a campus network or in an office building, one may want to create a LAN that is wired but provides terminal mobility. The "mobile terminals" would then connect to "base stations" via wired connections (using the Ethernet protocol, for example), but they would still have mobility in the sense that they could be connected at any point of the LAN and would have the same IP address without requiring any re-configuration.

The embodiments described here are optimized for packet data, for example IP traffic, but it will be understood that Applicant's invention can be embodied in networks that handle voice traffic. To ensure voice quality, either an overdimensioned access network or resource allocation methods need to be used. As a packet-based system is currently considerably cheaper in terms of hardware and maintenance than a traditional cellular voice system, an overdimensioned network is still probably commercially competitive.

SUMMARY

In accordance with Applicant's invention, communication networks and network nodes for carrying packet data traffic have architectures that give large freedom in network topology and simplify network extensions, accompanied by a lightweight but robust protocol. A network may be a cellular network that handles packet data traffic and voice traffic. Location information relating to terminals in a network may be determined through terminal-originated packets or control messaging. Stored location information may be cleared by elapse of time or specific messaging. Location information for different kinds of terminals may be stored in a centralized or distributed database.

In one aspect of Applicant's invention, a communication network for exchanging data packets with a wireline network includes a plurality of nodes, at least one remote terminal for communicating with a node, and a gateway node in communication with the wireline communication network and with the nodes. At least one node includes a database for storing location information, which may have limited lifetime or be updated by specific messages, and each node includes means for forwarding data packets arriving at the node.

Remote terminals may periodically send control packets to the nodes for updating respective location information relating to the remote terminals in the database, which includes a connection management database and/or a location management database for storing location information relating to remote terminals. A connection management database typically stores location information relating to remote terminals that are exchanging data packets with the wireline network. A location management database stores location information relating at least to remote terminals that are not exchanging data packets with the wireline network, and may store location information relating to remote terminals that are exchanging data packets with the wireline network.

Each node includes a predetermined root-port for sending data packets to the gateway node and at least one of either a leaf-port for receiving data packets from a root-port of another node or a port for exchanging packets with remote terminals. Data packets sent from the wireline communication network are directed to the remote terminals based on the location information in a connection management database.

In further aspects of the invention, the control packets may include show-up packets, keep-alive packets, and their opposites. The control packets may be routed from root-port to root-port toward the gateway node, with the show-up packets updating location information in the connection management database(s), the keep-alive packets updating location information in the location management database (s), and their opposites removing location information from the respective databases. Database entries relating to respective remote terminals may each include remote terminal identification information and a list of at least one port through which a packet has arrived from the respective remote terminal within a predetermined time period.

In yet further aspects of the invention, macrodiversity combiner devices may be included in one or more nodes for detecting duplicate data packets arrived at the nodes and for discarding duplicate arrived data packets.

In still further aspects of the invention, a node in a communication network for exchanging data packets with a wireline network has features comparable to those of networks described above.

BRIEF DESCRIPTION OF THE DRAWINGS

The various features and advantages of Applicant's invention will be understood by reading this description in conjunction with the accompanying drawings, in which:

FIG. 4 illustrates operation and maintenance (O&M) packet types;

FIG. 6 illustrates forms of CMP and LMP database entries; and

FIGS. 7 and 8 illustrate algorithms in pseudo-code run by node control processors for packets received through leaf and root ports, respectively.

DETAILED DESCRIPTION

Figure 1:
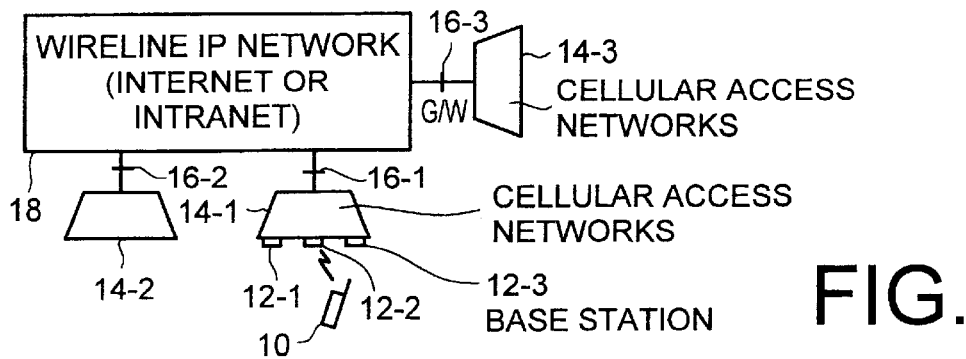
FIG. 1 illustrates a network configuration.

This application describes novel methods of building and controlling terminal access networks in the environment illustrated by FIG. 1. One feature of these methods is the use of a connection-less datagram protocol that provides the same service to upper layers as does a conventional datagram protocol, e.g., IP, but that supports and hides user mobility and handoffs. In this application, this novel protocol is called IP' to distinguish it from the conventional IP and to highlight its similarities to IP. The name IP' is used simply for convenience, however, because this description is often given in terms of IP-based packets. It will be understood that the description applies equally well to other forms of packet data and is not limited to networks using IP-format packets.

To support radio channel re-use for efficient spectrum utilization and enhanced capacity, the service area of an IP-based wireless network service area may be divided into cells, as in today's mobile radio telephony systems. Each cell in the IP-based network will be served by a base station (BS) that will be connected to a wireline IP-based network (for example, the Internet or an intranet) through a cellular access network (CAN). This is illustrated in FIG. 1, which shows a mobile terminal 10 in wireless communication with a BS 12-1 and two other BSs 12-2, 12-3. The BSs 12 are part of a CAN 14-1, which is one of several CANs (CANs 14-2, 14-3 are shown) that are each connected through a respective gateway node 16-1, 16-2, 16-3 to a wireline IP network 18.

As noted above, Applicant's invention is applicable in wired environments, like LANs, that provide terminal mobility by permitting terminals to be connected at several points and keep the same address. Accordingly, the term CAN will be understood as encompassing such environments.

One important role of a CAN 14 is to "hide" the local mobility of the mobile terminals (users) from the wireline IP network, thereby enabling the wired network to be "mobility-unaware". As in today's cellular systems, a mobile user may move out of the service area of the user's home CAN 14, and interworking among CANs will be needed to maintain service for such users. This feature, which may be called "global mobility", requires in addition to appropriate gateway nodes that each CAN should be able to serve users that are not assigned to it once and for all time and that the same protocol, e.g., IP', should be used in more than just one CAN. In addition, the wireline IP network would need a mechanism for sending packets addressed to a particular user to the particular CAN where that user is connected at that moment; one such mechanism is mobile IP, which is described in C. Perkins, http://www.ietf.org/internet-drafts/draft-ietf-mobileip-protocol-15.txt (Febuary 1996) and C. Perkins, "IP Mobility Support version 2", http://ietf.org/internet-drafts/draft-ietf-mobileip-v2-00.txt (Nov. 12, 1997), both of which are expressly incorporated here by reference.

Another aspect of global mobility that may be considered involves user addressing. For example, if all users of a particular CAN 14 should have IP addresses that have a particular form (e.g., addresses that begin with a predetermined character string), then a user who roams into the service area of that particular CAN would first have to obtain such an IP address, in addition to the user's normal IP address. This could make roaming problematic.

Figure 2:
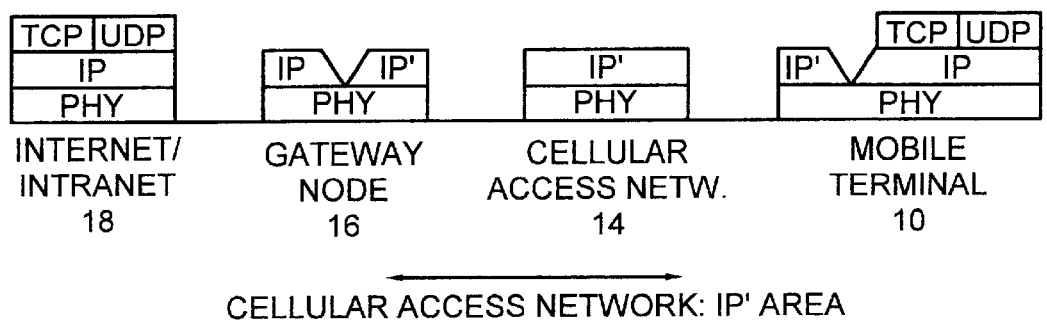
FIG. 2 illustrates protocol stacks at various places in a network.

The protocol stacks in FIG. 2 show IP' as a protocol that is terminated and connected to IP (shown as the same layer) at the gateway node 16 and at the wireless terminal 10. It will be understood that IP' and IP are usually considered Layer 3 protocols, and thus FIG. 2 should be considered as being merely illustrative.

Data packets in the IP' area can advantageously be conventional IP packets, and thus such IP' data packets can simply be passed to the IP area, which comprises mainly the wireline IP network 18 and higher layers of the wireless terminal 10. This completely hides mobility-related issues from entities outside the IP' area, which comprises mainly the CANs 14, and from higher layers in the terminals. In addition; this permits nodes in the IP' area to be implemented by conventional IP routers modified with IP' extensions, although as noted above, such use is not required and Applicant's network can use devices that are simpler and cheaper than conventional IP routers. Nodes in the IP' area contain packet forwarding engines that are substantially identical to those of standard IP routers, and route determination is defined by the IP' protocol. The physical layer protocols PHY (Layer 1) and higher layer protocols TCP and UDP (Layer 3) are not relevant to this application, and as noted above, this invention is not limited to IP packets.

As an overview of IP', it should be understood that two parallel systems of distributed and approximate-location databases are maintained in the cellular network. The two systems have substantially identical structures and both are used in routing packets to a mobile user when location information for the mobile user is available. If no location information is available, the systems gracefully degrade to local broadcasting. One may measure the system efficiency of an IP' network in terms of its distance from a network that uses local broadcasting.

One of the two systems may be called connection management and is used to route data packets; the connection management system is maintained only for users that are currently sending or receiving data. It will be appreciated that the connection management system should be updated frequently in order to minimize periods of inefficient local broadcasting.

The other system may be called location management and is maintained for all users in the service area of the CAN. The location management system of databases can thus be expected typically to be considerably larger than the connection management system of databases, although the location management system is used mainly for searching for a user before data can be sent to it. Accordingly, the location management system of databases can be "coarser" than the connection management system because occasional broadcasts of small user-search messages would not significantly reduce the performance of the network.

In general, one can view this arrangement of location and connection management systems as embodying a large amount of coarse location information on all users in a service area and a smaller amount of more accurate location information on users actually engaged in communication. Both systems are advantageously distributed in that the databases are spread among the nodes of the network, and the accuracy of the location information can be "tuned" simply by configuring more or fewer nodes to include databases. If none of the nodes is configured as a database, the network gracefully degrades to a conventional broadcasting-based communication network with reduced performance. By configuring more nodes as databases, network performance can be increased in exchange for increased node complexity.

The following description considers three components of Applicant's protocol: network topology/architecture; packet formats/addressing; and database structure/maintenance and routing.

Network Topology/Architecture

As an initial matter, it can be assumed that special characteristics of the air interface such as error rate and fading are handled by a suitable protocol, and hence the air interface appears to the IP' layer as a regular link of low and variable bit rate, which can become congested.

Figure 3:
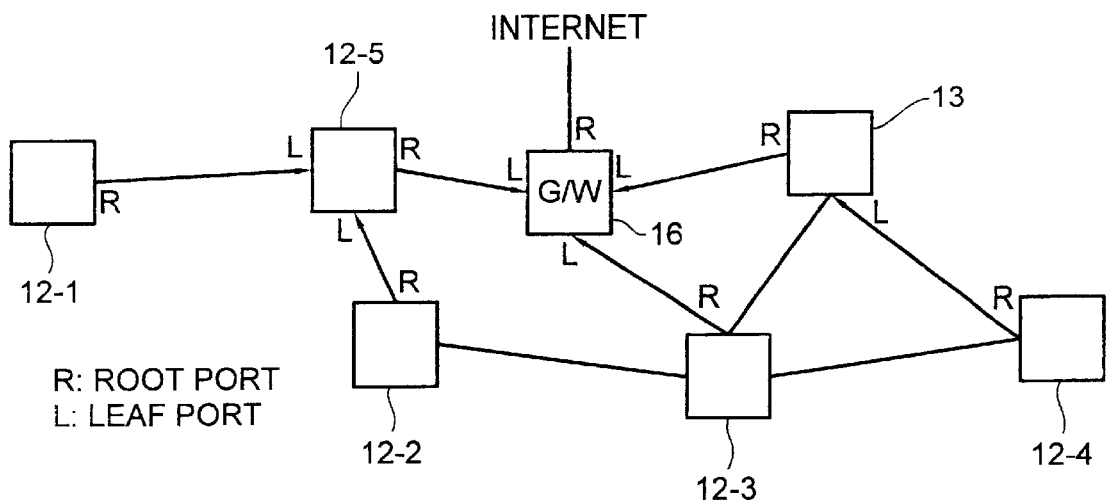
FIG. 3 illustrates routes, or paths, through the network, including root-ports and routes free of closed loops.

As illustrated in more detail in FIG. 3, a CAN 14 comprises nodes and links that interconnect nodes and that carry packets between nodes. In accordance with usual networking terminology, links are called ports from a node's point of view. In contrast to the usual networking terminology, this application does not distinguish ports that connect to a wireline link from ports that connect to an air interface link. As far as a node in an IP' network is concerned, an air interface is just another link through which packets can be exchanged with remote terminals. Any node, including a gateway node 16, can have one or more ports connected to one or more wireless communication devices like radio transceivers that enable the node to exchange packets with users located in the node's coverage area. These ports can be called air interface (AI) ports, and nodes containing one or more AI ports can be called base station (BS) nodes. To the IP', an AI port looks like a regular port. For example, FIG. 3 shows five BS nodes 12-1 through 12-5, for which the AI ports are not expressly illustrated.

In addition to BS nodes and gateway nodes, a CAN 14 may include nodes that are neither BS nodes nor gateway nodes. Such nodes may perform various functions, including concentrating traffic, reducing the number of ports needed at other nodes, accommodating the location information databases, etc. Continuing the analogy to cellular radio telephony, such nodes would correspond to BS controllers and MSCs, which typically do not include air interface equipment, and thus such nodes can be called BSC nodes. FIG. 3 shows one BSC node 13.

Applicant's protocol can operate over an arbitrary network topology provided that in each node there is specified a default or preferred next-hop towards a gateway node 16. In other words, each node should know which of its outgoing ports to use for forwarding a packet to the gateway node. Such a node port can be called a "root-port", and these are identified in FIG. 3 by the reference character r. The default routes, i.e., the paths through the network that consist of root-ports, must be free of closed loops, as illustrated for example by FIG. 3.

Each node must also be aware of which of its ports is connected to a root-port of another node, viz., which of its neighboring nodes uses this node as a next-hop toward the gateway node. These node ports can be called "leaf-ports", and are identified in FIG. 3 by the reference character 1. A node may have more than one leaf-port, as illustrated in FIG. 3 by the BS node 12-5 and the gateway node 16. It will be understood that the network may include BS nodes that have no leaf-ports, e.g., the BS nodes 12-1 through 12-4 in FIG. 3. Such BS nodes would have at least a root port and one or more AI ports for communicating with remote terminals. It will also be understood that although a BS node does not have a leaf-port, the BS node may still be connected to one or more other BS nodes; for example in FIG. 3, BS nodes 12-2 and 12-3 are connected and BS nodes 12-3 and 12-4 are connected. Such links through ports that are neither root-ports nor leaf-ports are advantageous from a reliability point of view, in that they provide alternate routes for packets in the event of port or link failures. It will be understood that such reliability enhancing links can also be provided between nodes other than BS nodes. Such links are not required, however, as illustrated in FIG. 3 by BS node 12-1.

The default routes can be established manually by network management or by a separate protocol like those well known to IP networks. In IP terminology, a "routing protocol" is a software algorithm, often distributed, that determines the port through which a node should forward a packet to let the packet reach a given other node. Such algorithms all ensure that there are no closed loops in the paths, and thus any of such algorithms could be used to establish the default routes in an IP' network. Nevertheless, such algorithms are more complex than is necessary because they usually let each node be able to forward packets to each other node, which is not needed in an IP' network. Some such algorithms are less complex than is necessary if they do not let nodes know which of their ports are used for next hops by neighboring nodes. This information is not needed for an IP network, but it is for an IP' network.

Two of the many possible "routing protocols" that can be used for establishing default routes are known in the IP community as "routing information protocol" or RIP and "open shortest path first" or OSPF. The RIP and OSPF routing protocols are described in the literature, including C. Huitema, *Routing in the Internet*, Prentice-Hall (1995) that is incorporated here by reference.

The efficiency of Applicant's IP' protocol decreases if either the network topology or the default routes change often due to the need to update the databases, but network reconfigurations after an equipment failure or in a heavy congestion situation generally do not jeopardize performance. It will be understood that an IP' network behaves just like an IP network when it comes to reconfigurations, failures, etc. The networks work best if their topologies and settings are constant. Applicant's IP' network, however, does not "die" if one link goes down, unlike networks like conventional cellular telephone networks; instead, traffic can be routed to another link and the network keeps working.

Of course when such re-routing occurs, some packets may get lost (both in the IP network and in an IP' network), and because the location databases need some time to adapt to the new situation, there will be more broadcasting than normal for a short period. It is also possible that packets get lost after a change due to inconsistency of the location databases, but this problem disappears after a time and the network can recover automatically, i.e., without intervention by a network manager, if the default routing (root-ports to leaf-ports) is restored or maintained. A network manager would need to restore the default routing if that were no mechanism to do it. Internet routing protocols solve such problem automatically. Nodes typically monitor the transmission equipment (Layer 1) and notice failures immediately. The automatic recovery process of the RIP is described at page 70 of the Huitema book cited above.

If changes are frequent, then these problems occur frequently and the network operates in an "exceptional" state much of the time, during which the location databases have limited value. For example, there will be much broadcasting and thus links will be overloaded and thus packets will get lost, etc. Still, network performance, which may be defined in terms of packet losses, delays, network overloads, etc., will gracefully degrade instead of crashing when the first thing goes wrong.

In the first part of the following description of Applicant's protocol, it is assumed that the default route setting is constant; the problem of changing default routes is described further below in considering protocol robustness. Also for convenience of explanation, the first part of the following description assumes that the network has a single link to the wired IP network 18, and thus a single gateway node 16. The operation of the protocol in a system having more than one gateway nodes is described further below.

Packet Formats/Addressing

As explained above, IP data packets are mapped one-to-one to IP' packets, advantageously with no changes to the packets. Applicant's IP' protocol allows mobile terminals, and terminals in general, to have conventional IP addresses. These addresses can also be used to identify the terminal in the CAN 14, hence no other terminal addresses are required. Data packets can be regular IP packets. It will be recognized that mobile and/or other terminals 10 can have special "mobile terminal" identifiers and/or "other terminal" identifiers, and conversion of IP addresses to such special identifiers could take place at the gateway node 16. It will also be recognized that data packet formats other than conventional IP packets could be used in the IP' area.

This description disregards how IP data packets intended for a user terminal 10 reach a gateway node 16 through the network 18. This is handled by the features of the IP if the CAN 14 connected to the gateway node 16 is the home network for the terminal 10 but not if the terminal 10 is a visitor in the CAN 14. The latter case is called in this application "global mobility" and must be handled by a global protocol.

A trivial solution to the global mobility problem is the mobile IP protocol described in the IETF document by Perkins that is cited above and that is incorporated here by reference. With mobile IP, the CAN 14 may appear to the network 18 as a subnetwork; a terminal 10 visiting the CAN 14 subnetwork would inform its home agent of its status, and the home agent routes the terminal's packets to that particular CAN 14 by the usual triangular routing. The operation of home agents and triangular routing is described in the IETF document by Perkins cited above. Inside the CAN 14, the visiting terminal 10 can be treated as any other terminal since a terminal's address that is included in packets sent to and from the terminal has no location significance in IP in the sense that the address is the same regardless of where the terminal is in the CAN. This is different from IP, in which a terminal's IP address indicates the subnetwork where the terminal resides.

In the IP' area of FIG. 2, operation and maintenance (O&M) packets are provided that are separate from the data packets, and the O&M packets remain inside the IP' area. Three advantageous types of O&M packets are illustrated in FIG. 4: keep-alive packets, paging packets, and show-up packets. Although O&M packets illustrated in FIG. 4 may have formats that differ from conventional IP packet formats, this is not necessary; O&M packets may be IP-type packets, although they must be distinguishable from data packets. One way to distinguish the control packets is to use an optional information element, either one already provided for or a new one in the IP format. This would add only a few bytes to the IP header, and the resulting packet would still be compatible with IP. It is important to note that even with a new information element, existing IP routers in the wireline network need not be modified to understand the new element because control packets do not leave the CAN.

In general, each of the different types of control packets includes an identifier of the terminal 10, whether that identifier is a conventional IP one or a special identifier described above. The destination of the paging packet is the terminal 10. The destinations of the keep-alive and show-up packets are the gateway node 16, and these packets are always routed by the default tree-route.

Keep-alive packets are sent periodically by a terminal 10 all the time when the terminal has no other data or control (show-up) packet to send. If a terminal 10 is in contact with more then one BS node 12, the terminal 10 may send keep-alive packets to all of them. The keep-alive packets are routed by the tree-route towards the gateway node 16, and they configure each location management point (LMP) database along the way as described in more detail below.

Show-up packets are dummy data packets that a terminal 10 sends from time to time as necessary for configuring connection management point (CMP) databases along the way, as described in more detail below.

Database Structure/Maintenance and Routing

Figure 5:
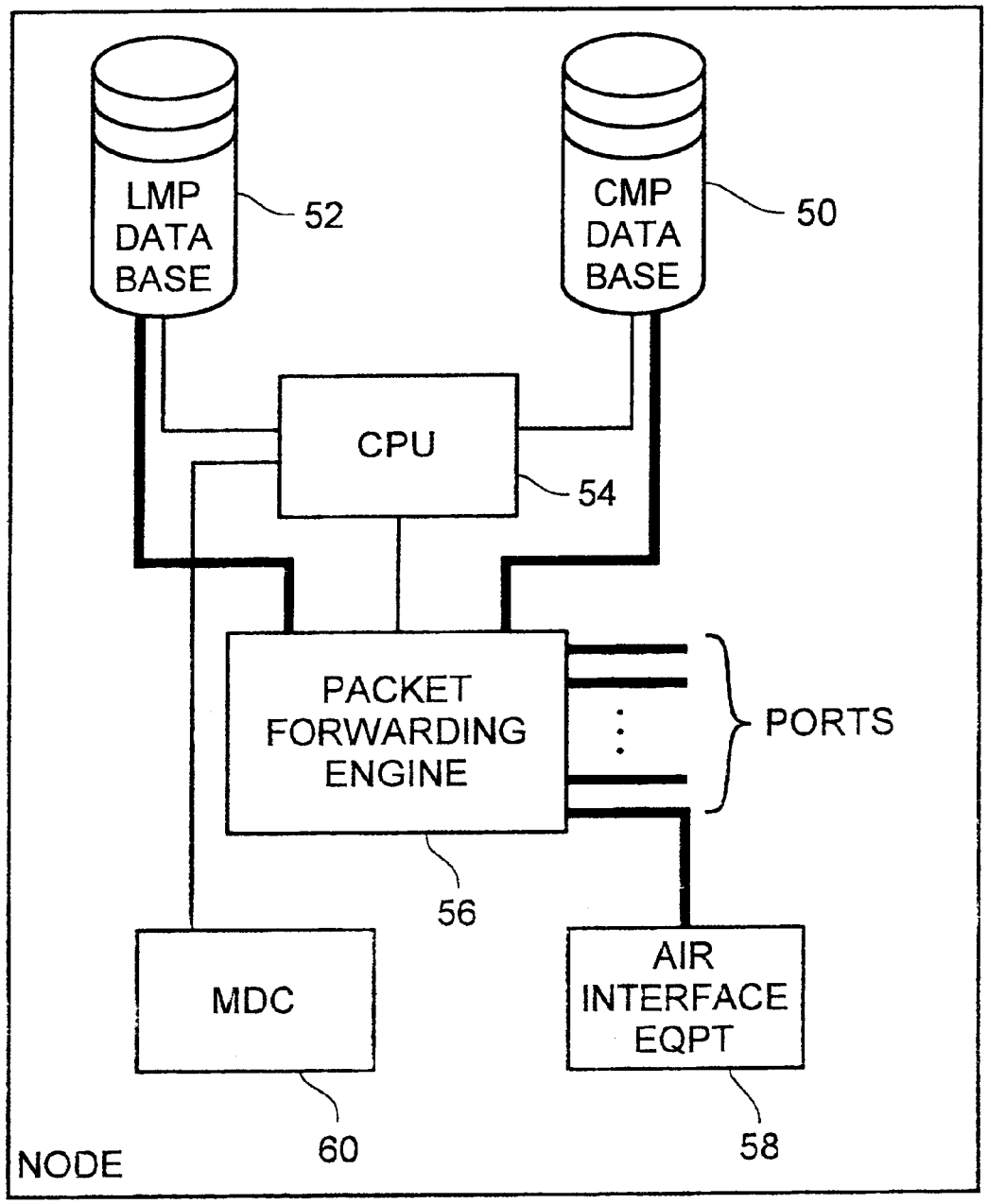
FIG. 5 is a block diagram of a node that indicates relationships among a CMP database, a LMP database, a central processing unit (CPU), a packet forwarding engine, and a macrodiversity combiner (MDC)

Each node 12, 13, 16 of the CAN 14 may contain either or both of a connection database, called a "connection management point" (CMP), and a location database, called a "location management point" (LMP); nodes can also contain neither a CMP nor a LMP. FIG. 5 is a block diagram of a node that indicates the relationship between a CMP database 50, a LMP database 52, a central processing unit (CPU) 54, and a packet forwarding engine 56 having one or more ports. As noted above, if the node is a BS node 12, it will include at least one AI port that is indicated schematically by a block 58 labeled air interface equipment. Also, the node may optionally include one or more macrodiversity combiner (MDC) devices 60, the functions of which are described in more detail below. Control signal connections between the devices are shown by the thinner lines and packet connections between the devices are shown by the thicker lines, and it will be understood that the node may include other devices and connections as appropriate.

The optional databases 50, 52 can simply be information storage locations in any convenient data storage device, such as a hard disk drive or semiconductor or optical memory, that is connected to the CPU 54, which may be an Intel Pentium II or other processor or application specific integrated circuit, that may perform other functions needed for operating the node.

A node that includes neither a CMP database 50 nor a LMP database 52 uses its packet forwarding engine 56 to receive and temporarily store arriving packets, consults its CPU 54 for instructions on whether an arrived packet should be sent out through the root-port if it arrived through a leaf-port or through the leaf-ports if it arrived through the root-port, and forwards the packet through the appropriate port or ports after any necessary buffering. Such buffering might be necessary to compensate for port congestion; when there are temporarily more packets to forward through a port than the capacity of the port, the packets are temporarily buffered to "wait their turns". If the long-term amount of data to send over a port does not exceed the port's capacity, then packets need not be dropped, although they will experience some delay. As a buffer has a finite capacity, packets might still have to be dropped due to lack of space in the buffer.

A node that includes one or both databases 50, 52 uses its packet forwarding engine 56 to receive and temporarily store arriving packets, and its CPU 54 determines the type (data, show-up, etc.) of arrived packets. If a packet arrived through a root-port, the CPU 54 consults the appropriate database 50, 52 to determine the leaf-port or leaf-ports through which the packet should be forwarded. If the packet arrived through a leaf-port, the CPU 54 updates the database(s). The packets are forwarded by the engine 56 through the appropriate port or ports after any necessary buffering as described above.

The form of the CMP and LMP databases is preferably identical, with each database comprising "entries" of a form such as that illustrated by FIG. 6. As shown in FIG. 6, an entry contains an identifier of a terminal 10 and a list of ports, the port-list containing at least one port, up to a maximum of all of the respective node's ports.

The ports in a port-list remain valid for a limited time, which is determined by the selectable parameters CMP-timeout and LMP-timeout for ports in CMP and LMP entries, respectively. A timed-out port is cleared from the port-list of a database entry unless an event has occurred that renewed its validity, i.e., reset the timeout period. One way to implement this is to assign, in each list, a timer to each port. It will be understood that such timers can be implemented in either software or hardware. The timer is set to either CMP-timeout or LMP-timeout, as appropriate, when the port is created in the list, and the timer is subsequently decremented by the node's clock, e.g., on the order of once per 100 milliseconds to one second. The timer is reset when an event triggers the renewal of the port's validity. Entries with all ports timed-out are cleared from the database.

A representative value of CMP-timeout is on the order of 100 milliseconds to one second, and this value depends on the average rate of session handoffs. A representative value of LMP-timeout is on the order of seconds to tens of seconds, again depending on the average rate of handoffs. It is currently believed that a network's performance is not sensitive to the exact values of the validity times CMP-timeout and LMP-timeout, which in general can be independent of each other. It is thus not required that the clocks maintained in nodes be synchronized. These timers would typically be network-specific constants, although it will be appreciated that a network operator could adjust these values during operation and even use different values in different portions of the network.

The CMP and LMP databases are maintained dynamically during network operation according to exemplary algorithms that are described below.

Both CMP and LMP databases are configured uniquely by uplink packets, i.e., packets sent from a terminal 10 to a BS node 12 since on receiving a packet from a terminal 10, the BS node "knows" through which of its (leaf) ports that particular terminal can most probably be reached. LMP databases are preferably updated by any packet arriving from a terminal 10, viz., the port through which the packet arrived is added to the terminal's entry's port-list if that port was not on the list, and that port's timer is reset if the port was on the port-list. CMP databases operate in the same way, except that CMP databases ignore keep-alive packets.

In general, LMPs could stop tracking terminals involved in active data sessions, but this might have a negative effect on reliability. If LMPs do not track active terminals, there might be times when a terminal is not yet monitored by the CMPs and has stopped being monitored by the LMPs. In other words, LMPs store location information related to preferably all terminals, but at least to terminals not having location information stored in CMPs.

As LMP's preferably contain location information on all terminals 10, they can be large. Nevertheless, it is not necessary for every node to contain a LMP. Configuring some nodes with LMPs provides distributed and approximate location information about all terminals 10. The more LMPs in a network, the more precise this location information will be, but at the price of increased overall data base size.

Some imprecision of the distributed location information in the LMPs is acceptable since this information is not used to route user data packets. The location information stored in the LMPs is used to route paging packets that serve to find a terminal 10 before user data is sent to it.

Data packets are sent to the terminal 10 based on distributed location information stored in the CMPs, not the LMPs. The location information in a CMP is similar to that in a LMP, but the CMP keeps location information only for terminals engaged in communication. Among other things, this makes it necessary for the location information in a CMP database to be more precise than the location information in a LMP database in order to avoid the waste of resources associated with broadcasting downlink data packets, which are typically numerous and much longer than control packets. Also, the CMP database(s) are typically much smaller than the LMP database(s). This makes it possible to configure a large number of network nodes as CMPs, which is currently expected to occur in real networks.

CMP databases are created and updated based on data packets sent by a terminal 10, assuming there are any such packets. If a terminal 10 expects to receive data (e.g., the terminal has an open TCP session) but currently has no data to send, then that terminal can send as necessary show-up packets (i.e, dummy data packets) that also configure CMPs. If the terminal expects to send data but for some reason does not expect to receive data, then there is no need to configure the CMP databases.

It may happen that a user in the wired network 18 sends one or more data packets to a terminal 10 when the CMP databases are not configured because, for example, the terminal 10 is not expecting data. This situation can be expected to occur often; for example, when an e-mail is sent to a terminal, the first packet is "unexpected" and later packets of the same e-mail are "expected". In the absence of CMP information, the CAN 14 would search for the desired terminal 10 in a process called paging. Paging packets generated in the CAN 14 are routed to the terminal 10 according to the location information stored in the LMP databases. If the terminal 10 receives a paging packet, the terminal responds by transmitting a show-up packet, which then configures the CMP databases. In this way, it can be said that the approximate location information in the LMPs is made more accurate ("zoomed in") for terminals engaged in a communication.

It will be appreciated that data packets (or show-up packets) that are sent by a terminal 10 as the terminal moves will configure the CMPs appropriately so that the CMP databases know the terminal's new location. Once a terminal moves, it is not necessary to delete previous-location information from the LMP and CMP database; outdated location information is simply cleared from the databases after selectable time-out periods elapse. In this way, database configuration is simplified, although before location information times out, data will also be sent to the terminal's old location. This waste can be limited by selecting small time-out periods. As described below, a tradeoff can be made between the lengths of the time-out periods and the repetition rate of the show-up packets.

Algorithms Run by Nodes

The algorithms for packets received through leaf- and root-ports that are run by control processors in the nodes are shown in pseudo-code in FIGS. 7 and 8, respectively. From these Figures, it can be seen that a node that is neither a CMP nor a LMP simply forwards all packets arrived through a leaf-port to its root-port and multicasts all packets arrived through its root-port to all its leaf-ports.

It can be noted that the Figures' references to queued and de-queued packets refer to the case when paging must be initiated, which will typically occur mainly in the gateway node 16. This is needed because when a data packet arrives at the gateway node and the location information for the destination terminal 10 is not in the CMP, paging must be initiated and the arrived packet(s) must wait for the result of the paging. These packets are sent to the terminal 10 when the show-up packet sent by the terminal in response to the paging has arrived.

Nevertheless, it is not always necessary to queue incoming data packets in the gateway node 16 or elsewhere while paging. A simple but less efficient alternative to queuing is to use the first incoming data packet as the paging packet, i.e., the first incoming data packet is routed as if it were a paging packet. If control packets are distinguished from data packets and from one another by added information elements as described above, then such an information element would be added to the first incoming data packet to convert it into a paging packet. The data content of the packet would remain unchanged.

The processes carried out be the nodes are based on the assumption that there is always sufficient space for a new entry in the CMP and LMP databases. This might not be the case in a real system in which a node might run out of memory. It is believed network performance will degrades smoothly if the databases are incomplete or inconsistent due to insufficient memory or failures. A node whose CMP and/or LMP database(s) have no information on a terminal because of lack of memory, or any other reason for that matter, can simply act as if it were not CMP or LMP. This is an issue of network robustness that is described in more detail below together with network dimensioning considerations. Special attention is given to the gateway node and to AI ports (BS nodes).

Algorithm Run by Terminal 10

The terminal 10 monitors one or more known control channels of the CAN 14 to detect the presence of base stations 12, and the terminal selects one or more of the detected base stations. The set of base stations selected by a terminal at any given time is called in this application the set of attached base stations. Most details of this detection and selection process can be the same as the corresponding process used in one of the current cellular communication systems. More generally, the detection and selection process can be based on network characteristics, pricing considerations, etc., according to the following examples:

greedy: attach to all detected base stations;

per-BS pricing: attach to a number of detected base stations, where the service price depends on the number of base stations attached and the terminal user (or user application) chooses the number; and C/I measurement based: measure signal strength and noise of channels to/from detected base stations and decide which base stations to attach to based on a selected or adaptive threshold with hysteresis and overlap.

As described above, a terminal 10 periodically sends keep-alive packets to the attached base stations when the terminal is not sending or receiving data packets. The period between such keep-alive packets can be called $T_{ka}$, and such packets can be sent to all base stations in the set of attached base stations whenever that period elapses. A keep-alive packet may also be sent to a base station immediately after that base station is added to the set of attached base stations regardless of the period $T_{ka}$. Although not a requirement, this improves efficiency at little cost by ensuring that there is almost no time when the terminal is unreachable; before the terminal sends its first keep-alive packet, the network does not know that the terminal may have moved into a new base station's service area after the terminal sent its last previous keep-alive packet. A representative value of the keep-alive packet repetition period $T_{ka}$ is on the order of 1/10 to 1/3 of the LMP-timeout parameter.

When a terminal 10 has a data packet to send, the terminal may send the data packet to one or more, and possibly to all, of the base stations to which the terminal is attached. The set of base stations to which a terminal sends data packets is called in this application the set of connected base stations. The considerations that affect whether an attached base station should or should not be a connected base station are substantially the same as the considerations that apply to the keep-alive packets. One difference is that if macrodiversity is needed, then the terminal may have to select more than one base station whenever possible. This is similar to existing systems, and macrodiversity is described below.

When a terminal 10 receives a paging packet, the terminal responds by generating and sending one or more show-up packets to the base stations in the set of connected base stations. The terminal continually sends show-up packets with a period $T_{su}$ when the terminal expects to receive a data packet (e.g., when the terminal has an open TCP session) but currently has no data packet to send. As noted above in connection with keep-alive packets, a show-up packet may also be sent to a base station immediately after that base station is added to the set of attached base stations regardless of the period $T_{su}$. Although not a requirement, this improves efficiency at little cost by ensuring that there is almost no time when the terminal is unreachable; before the terminal sends its first showup packet, the network does not know that the terminal may have moved into a new base station's service area after the terminal sent its last previous show-up packet. Nevertheless, regardless of this period, a show-up packet is sent to a base station immediately after that base station is added to the set of connected base stations. A representative value of the show-up packet repetition period $T_{su}$ is on the order of 1/10 to 1/3 of the CMP-timeout parameter.

The sending of keep-alive packets is suspended when data or show-up packets are being sent to a base station. If there are attached base stations to which no data or show-up packets are being sent (viz., if there are attached base stations that are not connected base stations), keep-alive packets are not sent to those base stations.

It is currently believed that the precision of the periods $T_{ka}$ and $T_{su}$ does not significantly affect network performance, and thus it is not required that the clocks in different terminals 10 be synchronized. It may be noted that the network would operate in substantially the same way if the clocks in the terminals (and base stations, for that matter) were synchronized. These timers would typically be network-specific constants, although it will be appreciated that a network operator could adjust these values during operation and even use different values in different portions of the network.

Using Applicant's invention, it is possible for a network operator to price data sessions in a manner proportional to the operator's costs. As control of the network is determined by packets sent by the terminal 10, the terminal user (or a user application) can choose its desired quality of received service, taking into account different prices for different levels of quality. For instance, one price (per time unit) may be assigned to the state of being attached to a base station and another price may be assigned to the state of being connected to a base station. The terminal user can then freely determine the number of base stations attached or connected; more attached base stations provide increased assurance that the terminal is reachable, especially in case of a handoff, in exchange for a higher price. The same applies to connected base stations: more connected base stations provide a smaller probability that a data stream or session will be cut-off after a handoff in exchange for a higher price.

Macrodiversity

In many cases, a data packet sent from/to terminal 10 may be sent through more than one BS node 12, and these duplicate packets travel through the CAN 14 separately to/from the gateway node 16. This redundancy may be called macrodiversity, and it is a feature of current cellular systems, as described for example in U.S. Pat. No. 5,088,108 among others. Macrodiversity is advantageous for several reasons.

The air interface may have a large bit error rate, so the probability of a packet getting spoiled in the air interface is not negligible. As in today's code division multiple access (CDMA) systems, it is possible to select from the duplicate packets, e.g., one that was not spoiled, usually based on an estimate of air interface error rate sent together with each packet. Packets not selected may be discarded. It is also possible to combine selected arrived duplicates, for example in a manner corresponding to downlink macrodiversity as described in U.S. Pat. No. 5,088,108; U.S. Pat. No. 5,109,528; and U.S. Pat. No. 5,327,577, all to Uddenfeldt. Once combined, the original arrived packets may be, in a sense, discarded.

For a seamless data-stream handoff, it is advantageous to establish the data path with a new base station before the data path with the old base station is torn down. This make-before-break operation is sometimes called soft handoff. During a soft handoff, two (or more) paths are active in parallel for a period of time. In order to prepare for an eventual handoff, it may be required to keep parallel paths active in a large proportion of operation time, either in general or for a particular data stream that may be identified as being likely to require a (future) handoff. For instance, handoffs can occur quickly and often in an indoor network having separate base stations in adjoining rooms, so it may be advantageous to operate in a macrodiversity mode most of the time.

Unlike today's cellular networks, in Applicant's network transmission in the wired network may not necessarily be guaranteed. (It will be understood that unguaranteed delivery and "connection-less" are related features of a network but they are not the same: a connection-less network can provide guaranteed packet delivery; connection-less refers rather to the lack of a mechanism that assigns a set of physical or logical resources to the data flow before the flow starts.) Data packets may get lost due to congestion in the wired network or due to hardware failure. Hence, in Applicant's network macrodiversity protects not only against errors due to the air interface but also against loss in the wired network.

It will be appreciated that the former two reasons also apply to conventional cellular systems, such as today's CDMA systems. The latter reason is specific to a connection-less network and further increases the importance of macrodiversity.

In Applicant's network, the number of downlink macrodiversity legs is determined by the terminal 10 by its sending data or show-up packets to BS nodes 12. The CMP databases are configured by these uplink packets, and thus downlink macrodiversity is achieved automatically: if a CMP has multiple ports listed for a terminal, a data packet intended for the terminal will be sent to all ports listed in the terminal's entry's port-list. (The terminal may typically receive all of those packets.) No special mechanism is needed.

For the uplink, the duplicate packets need to be compared at some point. Nodes capable of performing such comparisons are called in this application macrodiversity combiner (MDC) nodes. MDC nodes would be disposed at advantageous junctions along the default routes, e.g., the gateway node in order to avoid sending duplicate packets to the wireline network. In addition, MDCs would be included in nodes having a large number of branches, i.e., junctions that are sort of the middles of webs. This is an issue of network dimensioning that gives the network designer a large measure of freedom. Macrodiversity combination of data packets can be implemented in several ways that differ in complexity and performance.

The simplest MDC node would detect when duplicate packets have arrived, keep one, and discard the rest. This would not require the MDC node to be aware of active data streams or sessions; the MDC node would need only to cache some information on passed packets and match incoming packets to this cache. Such a simple MDC node would not protect against bit errors in the air interface, but the other two reasons for macrodiversity would still be fulfilled.

It is important with all MDC nodes that they notice the difference between duplicate packets resulting from macrodiversity and duplicate packets resulting from other reasons, for instance, TCP retransmissions. For this purpose, a terminal 10 might add some control information to its duplicate data packets; alternatively, a suitably adjusted timer could be used since the time between macrodiversity duplicates would usually be about an order of magnitude smaller than the time between TCP retransmissions.

A more sophisticated MDC node would buffer arriving data packets and wait until a duplicate or duplicates arrive. The MDC node could then compare the arrived packets and select one that is more likely to be error-free. The time period during which an arrived packet is kept waiting for its duplicate would be adjusted so as to minimize any impact on network performance. It is currently believed that this time period would not substantially depend on the type of data (e.g., voice, video, webpage, etc.) in the packets. Regardless of the type of data, duplicates would usually be sent at the same time or with little time difference (depending on the remote terminal's transmission equipment). Thus, the time period is expected to depend on the time needed for duplicates to reach the MDC, which should be short (due to buffering in some of the nodes) and which should depend on network topology, buffer sizes, etc.

Since the network could know that uplink macrodiversity was in use, e.g., through its knowledge of which BS nodes are communicating with which remote terminals, it may be more advantageous for an MDC node to be informed by suitable control information to expect duplicates than for the MDC node not to be explicitly informed about ongoing communication as mentioned below. Such control information could be provided to the MDC nodes by the CMPs or by a central control processor that could be disposed in a convenient one of the nodes and would receive communication information from the BS nodes. On the other hand, at least the MDC nodes would need to be aware of the network topology to use such control information, and thus such nodes would differ from Applicant's other generally topology-unaware nodes.

In order to avoid delaying packets in vain when a terminal 10 is not in a macrodiversity state, MDC nodes may advantageously keep track of captured packets and "notice" that some terminals usually send duplicates while others do not. In this way, an MDC node would have approximate information on how many packets to expect from a given terminal.

An even more sophisticated MDC node would perform application-specific handling of duplicate packets. Such an MDC node might "notice" that a terminal 10 sends packets regularly, even perhaps at predetermined times; based on such terminal behavior, the MDC node could establish a "soft connection" to the terminal in that the MDC would note the existence of a "connection", i.e., regularly occurring packets, and would act accordingly as long as the "connection" persists.

One feature common to all MDC nodes is that it is not necessary for them to be informed explicitly about ongoing data streams or sessions. Duplicate packets that are not dropped by an MDC node for some reason cause no other problem than some extra load. The gateway node 16 should be configured as an MDC node so that duplicate packets have little chance of leaving the respective CAN 14.

Extensions and Alterations

In describing the routing databases (CMP and LMP), it was indicated that if a terminal 10 appears in a database, then its database entry contains all the leaf-ports through which that terminal can be reached. In fact, it can be advantageous for a node to serve as a CMP or a LMP for just some, possibly even just one, of its leaf-ports, ignoring its other leaf-ports. This may be justified by network topology and it does not degrade system performance.

A typical case where this may make sense is the BS nodes. It is probably advantageous for a BS node to serve as a CMP and a LMP for its AI port(s) to avoid loading the air interface in vain. If the network topology does not justify configuring a BS node as a CMP or LMP, it makes sense to configure such a BS node as a CMP and/or LMP for its AI ports only.

This description has assumed that a node knows which of its ports is a leaf-port and that a node sends out downlink packets only through this port; this avoids having downlink packets arrive at a node several times and hence eventually circulate endlessly in the network. Another way to avoid this is by modifying the format of downlink data packets, for example by including an information element similar to the time-to-live (TTL) field in conventional IP packets, i.e., a hop counter. This information element would be set to an initial value when a packet is created, and the value in that packet would be decremented by each router. Since a packet would not be able to make more hops than its initial value, the packet would not endlessly hop around the network in the event of an error. Another way to avoid this, although perhaps more costly, is to cache in each node, e.g., in each node's packet forwarding engine, the sequence numbers of downlink packets and to discard duplicates.

Operation with Multiple Gateway Nodes

As the role of a CAN 14 is to hide the mobility of the terminals 10 from the wired IP network 18, the CAN should have few gateways to the wired network, and hence few (often just one ) gateway nodes 16. On the other hand, it is desirable for reliability purposes to have more than just one gateway node. Furthermore, a single gateway node 16 may become unable to handle the traffic as the network grows larger. Applicant's invention can be applied in networks having multiple gateway nodes as described below, and it will be understood that the following example can be readily generalized to find further solutions.

In accordance with Applicant's invention, the plural gateway nodes 16 of a CAN 14 should form a fully interconnected network. Each gateway node has its own respective tree structure, as illustrated for example by FIG. 3, and these trees are disjoint, which is to say that the trees do not share any nodes. Thus, each tree usually operates as a network having a single gateway node as described above.

When a gateway node 16 goes down for any reason, the failed gateway node's tree-routes are simply routed to a selected one of the surviving gateway nodes; the failed gateway node's tree-routes remain disjoint from the selected gateway node's usual tree-routes but for the connection at the selected gateway node. Thus, packets sent by a terminal 10 in the failed gateway node's tree structure simply use that tree and their own (replacement) gateway node at the root of the tree to reach the wired IP network 18.

It will be appreciated that if a terminal 10 moves from one node tree into another node tree (the trees being disjoint, as noted above), the point at which that terminal's packets enter and exit the wired IP network may change. This can happen in systems having more than one CAN 14, such as illustrated in FIG. 1, even in the absence of a gateway node's going down. Packets arriving from the wired IP network 18 to a gateway node 16 may then not necessarily arrive at the "correct" gateway node (i.e., the gateway node having the node tree that contains the terminal 10) since the wired network 18 does not necessarily know where the terminal is.

Such a change in entry/exit point is not a problem, especially if changes happen rarely, which is currently expected to be the realistic case. In any event, to route packets to the correct gateway node, all gateway nodes can either run a local mobile IP protocol or be configured to appear to one another as a leaf-port and route downlink (but not uplink) packets according to Applicant's IP' protocol described above. The features of the mobile IP protocol are described in the IETF document by Perkins that is cited above.

In fact, having two or more node trees in the same physical network has important advantages. Plural trees facilitate load sharing among nodes and selectable traffic routing, for compensating failures for example. These advantages can be realized when there is only one CAN 14 and one gateway node 16, when there is one CAN 14 and plural gateway nodes 16, and when there are plural CANs 14 and plural gateway nodes 16. One may note the special case when there are two or more gateway nodes, only one of which has a tree, the other(s) being provided for reliability purposes only. This special case can be handled in the same way as described.

Dimensioning Considerations

An important aspect of Applicant's invention is that the distributed LMPs have approximate knowledge about a terminal's location. This location information need not be very accurate since data traffic is not routed based on it; the approximate location information in the LMP databases only serves as routing information for paging the terminals.

In another important aspect of the invention, the approximate location information is made more precise when a terminal is engaged in communication to avoid wasting resources when data is routed to the terminal. Still in a distributed way, the CMPs have more accurate knowledge of the locations of the terminals engaged in communication.

Hence, the density of CMPs should be large for an efficient network, while the density of LMPs need not be so great. By density is meant the ratio of nodes configured as CMPs or LMPs to the total number of nodes. Indeed, in some cases it may be preferable for all or substantially all nodes to be configured as CMPs (density≈1), but only a few should be LMPs. It is preferable but not necessary that the gateway node would be an LMP, and all BS nodes would be LMPs, at least for their AI ports, as noted above. In addition, nodes at "busy" junction points in the network (i.e., nodes through which a relatively larger amount of traffic flows) would also be LMPs. The gateway node(s) would be MDC (s), as would be a few other nodes, like the LMPs. The different densities of CMPs and LMPs is consistent with the observation above that while CMPs and LMPs may have similarly complex hardware and software, CMPs have considerably smaller databases than LMPs because CMP databases contain entries only for terminals engaged in communication.

If possible, gateway nodes should be CMPs, LMPs, and MDCs at the same time. BS nodes should be CMPs and preferably also LMPs, at least for their AI ports. In cellular terms, a base station controller (BSC) and a mobile services switching center (MSC) may be non-BS-nodes as noted above in connection with FIG. 3 (see node 13), and an MSC could be a gateway node. At least in a cellular communication system according to the GSM standard, BSCs and MSCs would not be BS nodes, as noted above. An IP' network, on the other hand, has a structure that is less strict than that of a GSM network, so rather than BSCs and MSCs, there are simply equal nodes, some of which have AI ports (and hence are called BS nodes). If IP' were implemented on top of a GSM network, an MSC would be a gateway node and base stations would be BS nodes.

An important advantage of networks in accordance with Applicant's invention is robustness. The IP' protocol is not sensitive to timer accuracies, rendering the synchronization of node clocks unnecessary. Loss or delay of control packets (i.e., keep-alive, show-up, and paging packets) does not affect network operation until a large number of consecutive packets get lost or delayed. A failure in a LMP or CMP node simply results in some extra load in the network because duplicates of packets get sent in vain in wrong directions, but Applicant's protocol ensures a high probability that some packets will still be sent in the right direction. As there is no central control or central database, Applicant's network has no single point of failure. Nodes need not be configured all at once; the network can be built out using a plug-and-play mode. After cycling a node off and on, the node will soon be fully operational again.

If network topology or default routes change, the network remains operational so long as a default tree-routing is re-established. Uplink packets clearly only need the default tree-route to find the gateway node 16 to the wired IP network 18; downlink packets may miss the previously configured LMPs or CMPs but will mostly still reach the intended terminal 10 because these packets will be transmitted by other nodes. As soon as the next control or data packet is sent from the terminal 10 through the changed routes (which happens at most after a period $T_{ka}$ or $T_{su}$ elapses), downlink packets will directly find their way again. Hence, even if a loss of downlink packets occurs, network performance soon recovers automatically.

It is currently believed, however, that repeated, frequent changes in network topology or routing should be avoided to the extent such changes cause the network to operate almost continuously by broadcasting rather by using the distributed terminal location information. As described above, broadcasting is usually a serious degradation of network performance.

Regarding packet forwarding, nodes in the wired network 18 should act like conventional IP routers and have input and\or output buffers for overcoming short periods of congestion. Such nodes can simply drop packets if these buffers are full, letting higher layers deal with the loss. It can be noted that this similarity to conventional routers guarantees that if advanced quality provisioning techniques (e.g., differentiated services) are used in the wired network 18, those techniques can also be introduced in the cellular access network 16.

Important features of a network in accordance with Applicant's invention can be summarized.

The locations of active terminals are tracked through terminal-originated (uplink) packets rather than a separate signalling system. Applicant's invention reflects the observation that it is the remote terminal that best knows where the terminal is, and thus the terminal generates packets for determining its location (i.e., O&M packets) that are sent in the manner of ordinary data packets, thereby avoiding the expense of an SS7 or equivalent control signalling system. Nevertheless, it will be understood that this feature can be implemented in any packet data network, not just a network having distributed databases and "soft" states as described above. For example, a network having a centralized location database such as a GSM-type network extended to packet data (the general packet radio service (GPRS) or CDPD) could benefit by having the centralized location information updated through terminal-originated packets. Moreover, such a network need not use "soft" states, i.e., the locations of active terminals need not be tracked based on time-outs; location information for each terminal could be cleared in response to specifically transmitted uplink packets. Upon leaving the service area of a node, a terminal would send a packet that has an effect that is the opposite of the show-up packets described above, removing the terminal's respective location information in each node or in the centralized database.

Location and session information gets cleared by elapse of time rather than by specific messaging. As each piece of information stored in the system is assigned a finite timer and is cleared if no update comes before the timer expires, obsolete information can remain in the network only for a finite time that is bounded by the timers. In this way, the locations of active terminals are tracked based on time-outs, producing a network having "soft" states, i.e., states that are analogous to volatile memory rather than non-volatile memory. It will be understood that this feature can be implemented in a packet data network that does not have distributed location databases as described above and/or that uses a SS7 or equivalent control signalling system. For example, a network having a centralized location database such as a GSM-type network extended to packet data (the general packet radio service (GPRS) or CDPD) could benefit by having the centralized location information clear itself upon the elapse of a resettable time period. Also, upon leaving the service area of a node, a terminal would not need to send a control message (or packet) having the opposite effect of a show-up packet; the terminal's respective location information would simply time-out eventually in each node.

Location information relating to active terminals (i.e., those engaged in data sessions) is stored in a distributed database, with each node knowing only on which outgoing port to forward packets and no node knowing precisely the locations of the remote terminals. It will be understood that this feature can be implemented in a packet data network having a SS7 or equivalent control signalling system and/or no "soft" states. The distributed location information that is established by terminal-originated packets as described above would be established by control messages in the SS7 or equivalent control signalling system. "Soft" states based on timers would not be needed: upon leaving the service area of a node, a terminal could send a packet or a control message that has an effect that is the opposite of the show-up packets described above, removing the terminal's respective location information in each node.

Packets originated by a terminal 10 reach the gateway node 16 in finite time, and packets sent by a terminal 10 to a host on the wired network 18 follow the default routes through the CAN 14 by taking, in each node, the root-port. If a packet is not lost in the air interface, it reaches the gateway node unless (1) the network gets disconnected due to a failure, (2) the default tree-routing is not operational, or (3) there is congestion in the network. These problems are outside the control of Applicant's IP' protocol, although such losses can be handled by higher layers as is the case for regular IP networks. It will be noted that as soon as the cause of such losses is solved, the IP' protocol makes sure that the packets reach the gateway node without needing any manual reconfiguration.

Packets sent to a terminal 10 reach the terminal in finite time. If there are no location databases active in the network, each packet is multicast to all leaf directions in all forks of the node tree. Thus, one of the multicast packets will reach the terminal 10 if (1) the terminal is connected to a BS node, and (2) the terminal does not undergo a hard handoff such that it misses the packets both in the "old" and in the "new" BS nodes. The probability of such multiple misses is very small. At any node, a packet is not sent in a leaf direction only if there is recent information that the terminal 10 is reachable in another leaf direction. If the terminal has moved from its "known" location since the last update and is still covered by a BS node, the terminal must have just previously sent one or more control packets; thus, this and other nodes are informed about the new location unless the uplink packets are still en route. The probability of this situations is also very small. The probability of downlink packets getting lost is therefore very small as long as the terminal undergoes soft handoffs or very fast hard handoffs, only.

Packets get cleared in finite time. Packets sent from a terminal 10 take the default tree routes only, without duplicates being made. These packets therefore reach the gateway node 16 and leave the system if the default routing is error-free. Packets sent to a terminal 10 are forwarded in each node to leaf-ports only, and hence (1) with every forwarding the distance between the packet and the gateway node, measured in number of hops, increases, and (2) none of the nodes can receive the same packet twice. Downlink packets thus reach the "leaves" of the node tree in finite time and get delivered or cleared there.

These features can be provided by many protocols and networks, not only an IP-based network, that operate as described above. In addition although many features have been described in terms of active terminals, i.e., terminals engaged in data sessions, it will be understood that the same descriptions can be applied to inactive (e.g., attached but not connected) terminals. The design decisions behind Applicant's protocol are described below.

An approach at one extreme of the spectrum of possible ways of handling terminal mobility is to let uplink packets be routed in a conventional way, e.g., Internet routing, and to broadcast all downlink packets to all base stations. This is a very costly approach for downlink packets, which as a result is not used. To avoid broadcasting, knowledge of a terminal's location is desirable, which suggests an approach at the other extreme: provide a centralized database that keeps precise location information. Nevertheless, this approach entails frequent messages for updating the centralized database, even when the terminal is idle. GSM networks use location areas in an effort to strike a balance between these extremes.

According to Applicant's invention, not only can there be no centralized database but also none of the network nodes knows precisely the location of a terminal. Instead, each node knows a way to forward a packet to the terminal, regardless of any other nodes that may also forward packets to the terminal. This is desirable because the nodes can be unaware of the network's topology, and thus the nodes can be simple, reliable, easy to install, etc. Also, the forwarding information needed by each node is established by uplink packets instead of special control messages and is released by timers instead of explicit release messages. These aspects make Applicant's network simple and robust.

Accordingly and as described above, it is necessary only for Applicant's network to include CMP databases; LMP databases and MDCs, and BSC nodes for that matter, are optional. A network having only CMPs would operate but would also have two limitations. First, to allow for precise routing of packets, the network would need many CMPs, preferably one in each node, and those CMP databases would need to store location information for idle terminals as well as information for connected terminals. This suggests a variant of Applicant's invention that will be described in more detail below. It is currently believed that this would result in a large, frequently updated database in each (CMP) node, which would be inefficient. To reduce the time that outdated paths remain in the network, the CMP entry timers would need to be short, and thus terminals would need to send update packets frequently, even when idle.

These limitations can be avoided by adding a second tier of databases that deals with idle terminals, i.e., the LMP databases, thereby letting the CMP databases handle only active terminals. The idle-terminal databases can be less densely distributed through the network than the active-terminal databases and they can be less frequently updated.

As noted above, MDCs are optional in Applicant's network, which are also not necessary even for soft handoffs since a terminal can send data packets to one base station and at the same time can send show-up packets to other base stations. This would configure multiple downlink paths and ensure seamless handoff in that downlink packets would not be lost at a handoff.

The preceding description has described embodiments of Applicant's invention in which only the CMP database is necessary for an operational network. The need for many CMP nodes and the need for those CMP databases to store location information for both idle terminals and connected terminals are limitations that would result in a network that is less efficient when a substantial proportion of the terminals are inactive compared to when a substantial portion are active. The latter behavior is more typical of terminals in a cellular radio telephone network.

The behavior of civil emergency communication networks, like police and fire communication networks, differs from conventional cellular telephone networks in that most of the mobile remote terminals are inactive simultaneously. Networks having such behavior, which may include cellular radio telephone networks, can be realized by a variant of Applicant's invention in which it is necessary that selected network nodes include only LMP databases that include entries for both inactive and active terminals. It will be understood as above that MDCs and BSC nodes would be optional. The routing and dimensioning considerations described above would be used in determining the positions and density of the LMP nodes, which would generally have the configuration illustrated in FIG. 5, without the CMP database of course. As described above, the location information stored in the LMPs would not be used for routing data packets to the terminals but for routing paging packets that serve to find terminals before data is sent to them. It will be understood that in such an LMP-only network, location management for idle remote terminals is provided by Applicant's invention as described above, and location management for active remote terminals is provided by another technique, such as a centralized, SS7 scheme. This can be contrasted with a CMP-only network that has a single location management system for both active and inactive terminals.

It will be understood that this invention is not limited to the particular embodiments that are described and illustrated above. For example, although the embodiments are described above with reference to a cellular radio communication system, this invention is applicable to any type of communication system. The specification contemplates any and all modifications that fall within the scope of the invention as defined by the following claims.

What is claimed is:

1. A communication network for exchanging data packets with a wireline network, comprising:
   a plurality of nodes, wherein at least one node includes a database for storing location information, and each node includes means for forwarding data packets arriving at the respective node;
   at least one remote terminal for communicating with at least one of the nodes; and
   a gateway node in communication with the wireline network and with the nodes;
   wherein remote terminals periodically send control packets to at least one of the nodes for updating respective location information relating to the remote terminals in the database;
   wherein the database comprises a connection management database for storing location information relating to the remote terminals that are exchanging data packets with the wireline network; and
   the database further comprises a location management database for storing respective location information relating to remote terminals that are in a service area of a node but are not exchanging data packets with the wireline network; and
   wherein each node includes a root-port for sending data packets to the gateway node and at least one of the following ports: a leaf-port for receiving data packets from a root-port of another node and a port for exchanging packets with a remote terminal; and
   data packets sent from the wireline communication network are directed to the remote terminals based on the location information in the database.

2. The communication network of claim 1, wherein the control packets include show-up packets and opposite packets, the control packets are muted from root-port to root-port toward the gateway node, the show-up packets update location information in the connection management database, and the opposite packets remove location information in the connection management database.

3. The communication network of claim 2, wherein the connection management database comprises entries relating to respective remote terminals, and each entry includes remote terminal identification information and a list of at least one port through which a control packet has arrived from the respective remote terminal.

4. The communication network of claim 1, wherein at least one of the gateway node and the nodes includes a macrodiversity combiner for detecting duplicate arrived data packets and for discarding duplicate arrived data packets.

5. The communication network of claim 4, wherein remote terminals add control information to duplicate data packets sent by the remote terminals for use by the macrodiversity combiner in discarding duplicate arrived data packets.

6. The communication network of claim 5, wherein the macrodiversity combiner includes a timer for determining periods between duplicate arrived data packets and a duplicate arrived data packet is discarded if the period from a previously arrived duplicate data packet exceeds a predetermined period.

7. The communication network of claim 4, wherein the macrodiversity combiner buffers arriving data packets, waits until a duplicate of an arrived date packet has arrived, then compares the duplicate arrived data packets, and selects one that is more likely to be error-free.

8. The communication network of claim 1, wherein the location information has a limited lifetime, the control packets include show-up packets, the control packets are routed I, rom root-port to root-port toward the gateway node, and the show-up packets update the location information in the connection management database.

9. The communication network of claim 8, wherein the connection management database comprises entries relating to respective remote terminals, and each entry includes remote terminal identification information and a list of at least one port through which a control packet has arrived from the respective remote terminal within a predetermined time period.

10. The communication network of claim 1, wherein the control packets include show-up packets, keep-alive packets, and respective opposite packets, the control packets are routed from root-port to root-port toward the gateway node, the keep-alive packets update location information in the location management database, the show-up packets update location information in the connection management database, and the respective opposite packets remove location information in the respective database.

11. The communication network of claim 10, wherein the location management database and the connection management database each comprise entries relating to respective remote terminals, and each entry includes remote terminal identification information and a list of at least one port through which a control packet has arrived from the respective remote terminal.

12. The communication network of claim 1, wherein the location information has limited lifetime, the control packets include keep-alive packets and show-up packets, the control packets are routed from root-port to root-port toward the gateway node, the keep-alive packets update the location Information in the location management database, and the showup packets update the location information in the connection management database.

13. The communication network of claim 12, wherein the location management database and the connection management database each comprise entries relating to respective remote terminals, and each entry includes remote terminal identification information and a list of at least one port through which a control packet has arrived from the respective remote terminal within a predetermined time period.

14. The communication network of claim 1, wherein at least one of the nodes is a base station node that includes an air interface port for exchanging packets with remote terminals.

15. The communication network of claim 14, wherein at least one base station node includes a connection management database.

16. The communication network of claim 1, wherein the control packets include keepalive packets and opposite packets, the control packets are routed from root-port to root-port toward the gateway node, the keep-alive packets update location information in the location management database, and the opposite packets remove location information in the location management database.

17. The communication network of claim 16, wherein the location management database comprises entries relating to respective remote terminals, and each entry includes remote terminal identification information and a list of at least one port through which a control packet has arrived from the respective remote terminal.

18. The communication network of claim 1, wherein the location information has limited lifetime, the control packets include keep-alive packets, the control packets are routed from root-port to root-port toward the gateway node, and the keep-alive packets update the location information in the location management database.

19. The communication network of claim 18, wherein the location management database comprises entries relating to respective remote terminals, and each entry includes remote terminal identification information and a list of at least one port through which a control packet has arrived from the respective remote terminal within a predetermined time period.

20. A node in a communication network for exchanging data packets with a wireline network, the communication network including at least one remote terminal, and the node comprising:

a connection management database for storing location information relating to remote terminals that are exchanging data packets with the wireline network;

a location management database for storing location information relating to remote terminals that are in a service area of the node but are not exchanging data packets with the wireline network;

means for forwarding data packets arriving at the node;

a root-port for sending data packets toward the wireline network; and at least one of the following ports; a leaf-port for receiving data packets from a rootport of another node and a port for exchanging packets with a remote terminal;

wherein a remote terminal periodically sends control packets to the node for updating its respective location information in the database; and data packets sent from the wireline network are directed to a remote terminal based on the location information in the database.

21. The node of claim 20, wherein the control packets include show-up packets and opposite packets, the control packets are forwarded from the root-port toward the wireline network, the show-up packets update location information in the connection management database, and the opposite packets remove location information in the connection management database.

22. The node of claim 21, wherein the connection management database comprises entries relating to respective remote terminals, and each entry includes remote terminal identification information and a list of at least one port through which a control packet has arrived from the respective remote terminal.

23. The node of claim 20, further comprising a macrodiversity combiner for detecting duplicate arrived data packets and for discarding duplicate arrived data packets.

24. The node of claim 23, wherein the macrodiversity combiner discards duplicate arrived data packets based on control information added by a remote terminal to duplicate data packets sent by the remote terminal.

25. The node of claim 24, wherein the macrodiversity combiner includes a timer for determining periods between duplicate arrived data packets and a duplicate arrived data packet is discarded if the period from a previously arrived duplicate data packet exceeds a predetermined period.

26. The node of claim 23, wherein the macrodiversity combiner buffers arriving data packets, waits until a duplicate of an arrived data packet has arrived, then compares the duplicate arrived data packets, and selects one that is more likely to be error-free.

27. The node of claim 20, wherein the location information has a limited lifetime, and the control packets include show-up packets for updating location information in the connection management database, and the control packets are forwarded from the root-port toward the wireline network.

28. The node of claim 27, wherein the connection management database comprises entries relating to respective remote terminals, and each entry includes remote terminal identification information and a list of at least one port through which a control packet has arrived from the respective remote terminal within a predetermined time period.

29. The node of claim 20, wherein the control packets include show-up packets, keep-alive packets, and respective opposite packets, the control packets are forwarded from the root-port toward the wireline network, the keep-alive packets update location information in the location management database, the show-up packets update location information in the connection management database, and the respective opposite packets remove location information in the respective database.

30. The node of claim 29, wherein the location management database and the connection management database each comprise entries relating to respective remote terminals, and each entry includes remote terminal identification information and a list of at least one port through which a control packet has arrived from the respective remote terminal.

31. The node of claim 20, wherein the location information has limited lifetime, the control packets Include keep-alive packets and show-up packets, the control packets are forwarded from the root-port toward the wireline network, the keep-alive packets update the location information in the location management database, and the show-up packets update the location information in the connection management database.

32. The node of claim 31, wherein the location management database and the connection management database each comprise entries relating to respective remote terminals, and each entry includes remote terminal identification information and a list of at least one port through which a control packet has arrived from the respective remote terminal within a predetermined time period.

33. The node of claim 20, further comprising an air interface port for exchanging packets with remote terminals.

34. The node of claim 20, wherein the control packets include keep-alive packets and opposite packets, the control packets are forwarded from the root-port to root-port toward the wireline network, the keep-alive packets update location information in the location management database, and the opposite packets remove location information in the location management database.

35. The node of claim 34, wherein the location management database comprises entries relating to respective remote terminals, and each entry includes remote terminal identification information and a list of at least one port through which a control packet has arrived from the respective remote terminal.

36. The node of claim 20, wherein the location information has a limited lifetime, the control packets include keep-alive packets, the control packets are forwarded from the rootport toward the wireline network, and the keep-alive packets update the location information In the location management database.

37. The node of claim 36, wherein the location management database comprises entries relating to respective remote terminals, and each entry includes remote terminal identification information and a list of at least one port through which a control packet has arrived from the respective remote terminal within a predetermined time period.

* * * * *